(12) United States Patent
Jung

(10) Patent No.: US 10,159,958 B2
(45) Date of Patent: Dec. 25, 2018

(54) LNT CATALYST

(71) Applicant: HYUNDAI MOTOR COMPANY, Seoul (KR)

(72) Inventor: Chang Ho Jung, Osan-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 210 days.

(21) Appl. No.: 15/016,663

(22) Filed: Feb. 5, 2016

(65) Prior Publication Data

US 2017/0100707 A1    Apr. 13, 2017

(30) Foreign Application Priority Data

Oct. 13, 2015   (KR) .................. 10-2015-0142678

(51) Int. Cl.

| | | |
|---|---|---|
| *B01J 23/10* | (2006.01) | |
| *B01J 23/63* | (2006.01) | |
| *B01J 23/00* | (2006.01) | |
| *B01J 35/00* | (2006.01) | |

(52) U.S. Cl.
CPC .............. *B01J 23/63* (2013.01); *B01J 23/002* (2013.01); *B01J 35/0006* (2013.01); *B01J 2523/00* (2013.01)

(58) Field of Classification Search
CPC ...... B01J 23/63; B01J 23/002; B01J 35/0006; B01J 2523/00
USPC ........................................................ 502/304
See application file for complete search history.

(56) References Cited

U.S. PATENT DOCUMENTS

2014/0171302 A1*  6/2014  Jung .................. B01J 23/63
                                                    502/304
2015/0033715 A1*  2/2015  Markatou .......... B01D 53/9472
                                                    60/299

FOREIGN PATENT DOCUMENTS

| JP | 09-057098 A | 3/1997 |
| JP | H09299795 A | 11/1997 |
| JP | 2004000978 A | 1/2004 |
| JP | 2006138321 A | 6/2006 |

(Continued)

OTHER PUBLICATIONS

Korean Office Action dated Sep. 19, 2016 issued in Korean Patent Application No. 10-2015-0142678.

(Continued)

*Primary Examiner* — Haytham Soliman
(74) *Attorney, Agent, or Firm* — McDermott Will & Emery LLP

(57) ABSTRACT

A lean NOx trap (LNT) catalyst includes a plurality of carriers connected to each other in series, wherein each of the carriers is embedded with at least one of a first wash coat containing magnesium (Mg)-substituted alumina, ceria ($CeO_2$), barium (Ba), and a precious metal, a second wash coat containing magnesium (Mg)-substituted alumina, ceria ($CeO_2$), barium (Ba), a third wash coat containing magnesium (Mg)-substituted alumina, ceria ($CeO_2$), and a fourth wash coat containing magnesium (Mg)-substituted alumina, ceria ($CeO_2$), and a higher content of a precious metal than the first wash coat, a ratio of the magnesium-substituted alumina to ceria ($CeO_2$) being lower than that of the third wash coat, wherein the third and first wash coats are disposed in a foremost carrier through which exhaust gas passes sequentially from a front portion of the foremost carrier.

7 Claims, 5 Drawing Sheets

PRESENT INVENTION

EXHAUST GAS ⇒

| (300) | (100) |    | (200) | (400) |
|---|---|---|---|---|
| (100) | | | (200) | |
| (10) | | | (10) | |

500              600

(56) References Cited

FOREIGN PATENT DOCUMENTS

| | | |
|---|---|---|
| JP | 2006150258 A | 6/2006 |
| JP | 2008036629 A | 2/2008 |
| KR | 100960201 B1 | 5/2010 |
| KR | 10-2013-0109098 A | 10/2013 |
| KR | 10-20140079233 A | 6/2014 |

OTHER PUBLICATIONS

Notice of Allowance Korean Patent Application No. 10-2015-0142678 dated Mar. 10, 2017.

* cited by examiner

PRESENT INVENTION

PRESENT INVENTION

LNT CATALYST

CROSS REFERENCE TO RELATED APPLICATION

The present application claims the benefit of priority to Korean Patent Application No. 10-2015-0142678, filed Oct. 13, 2015 with the Korean Intellectual Property Office, the entire contents of which is incorporated herein for all purposes by this reference.

TECHNICAL FIELD

The present disclosure relates to a lean NOx trap (LNT) catalyst capable of preventing a foremost carrier from being degraded by oxidation heat and increasing occlusion capacity of the next carrier connected to the foremost carrier in series.

BACKGROUND

A lean NOx trap (LNT) catalyst or NOx occlusion catalyst (NSC) suggested in early 1990 was initially developed as a lean-burn gasoline catalyst. A separate three-way catalyst was disposed in a front end of the LNT catalyst, and due to characteristics of a gasoline engine, a catalyst temperature was higher than that of a passenger diesel engine. Therefore, alumina ($Al_2O_3$) was used as a catalyst support, and a catalyst containing a large amount (10 to 20 wt %) of high-temperature occlusion materials, such as barium (Ba), potassium (K), or the like, was used. However, at the time of using the catalyst as described above, $BaAl_2O_4$ was formed by a reaction between barium (Ba) and alumina ($Al_2O_3$), thereby causing a problem that NOx occlusion capacity of barium (Ba) may be deteriorated.

This problem was solved by introducing a cerium (Ce) component and magnesium-substituted alumina (spinel, $MgAl_2O_4$) for low-temperature occlusion. Accordingly, the LNT catalyst may be applied to an after-treatment catalyst of the passenger diesel engine, and as a catalyst support, a mixture of alumina ($Al_2O_3$) and ceria ($CeO_2$) is used. Particularly, ceria ($CeO_2$) plays an important role in occluding NOx at a low temperature specific to the passenger diesel engine as a material having a low catalyst temperature.

In order to prepare the LNT catalyst, 5 to 20 wt % of barium and precious metals are dispersed in alumina and ceria particles based on the entire wash coat.

At the time of preparing the spinel, an $MgAl_2O_4$ structure is formed by adding about 28 wt % of Mg (based on MgO) during an alumina synthesizing process. In general, barium spinel is prepared by impregnating barium in the spinel prepared by applying an MgO substitution ratio equal to or less than the numerical value as described above. This barium-spinel performs NOx occlusion capacity in a relatively high temperature region.

Generally, since it is difficult to prepare the LNT catalyst as a single brick catalyst due to characteristics of the LNT catalyst requiring a large amount corresponding to 70 to 90% of an engine displacement volume, a double brick or multiple brick method of disposing bricks having a predetermined diameter and length or less in series is used.

In the case of a double brick catalyst generally used in the art, a precious metal, that is, a platinum group metal (PGM: Pt, Pd, or Rh) is intensively disposed throughout the entire front-end brick (a direction toward an engine). This is to activate the catalyst immediately after starting the engine by additionally promoting heat generation by a catalytic reaction in the front-end brick firstly absorbing engine exhaust heat to promote an early raising of heating the front-end brick. However, in this case, the front-end brick may be degraded by an oxidation heat, such that NOx may be slipped (emitted) as it is.

The contents described as the related art have been provided only for assisting in the understanding for the background of the present disclosure and should not be considered as corresponding to the related art known to those skilled in the art.

SUMMARY OF THE DISCLOSURE

An object of the present disclosure is to provide a lean NOx trap (LNT) catalyst capable of preventing a foremost carrier from being degraded by oxidation heat and increasing occlusion capacity of the next carrier connected to the foremost carrier in series by disposing a plurality of carriers including a wash coat in series but disposing a wash coat containing a large amount of a precious metal at a front portion of a high-temperature foremost carrier through which exhaust gas passes to partially remove CO, HC, or the like, and disposing a wash coat having relatively low oxidation power in a rear portion of the foremost carrier.

According to an exemplary embodiment of the present disclosure, there is provided a lean NOx trap (LNT) catalyst including: a plurality of carriers connected to each other in series, wherein each of the carriers is embedded with at least one of a first wash coat containing magnesium (Mg)-substituted alumina, ceria ($CeO_2$), barium (Ba), and a precious metal; a second wash coat containing magnesium (Mg)-substituted alumina, ceria ($CeO_2$), barium (Ba), and a lower content of a precious metal than the first wash coat; a third wash coat containing magnesium (Mg)-substituted alumina, ceria ($CeO_2$), and a higher content of a precious metal than the first wash coat; and a fourth wash coat containing magnesium (Mg)-substituted alumina, ceria ($CeO_2$), and a higher content of a precious metal than the first wash coat, a ratio of the magnesium-substituted alumina to ceria ($CeO_2$) being lower than that of the third wash coat, wherein the third and first wash coats are disposed in a foremost carrier through which exhaust gas passes sequentially from a front portion of the foremost carrier.

The first and third wash coats may be disposed in a rearmost carrier through which the exhaust gas passes, sequentially from a front portion of the rearmost carrier.

The second and third wash coats may be disposed in a rearmost carrier through which the exhaust gas passes, sequentially from a front portion of the rearmost carrier.

The first and fourth wash coats may be disposed in a rearmost carrier through which the exhaust gas passes, sequentially from a front portion of the rearmost carrier The second and fourth wash coats may be disposed in a rearmost carrier through which the exhaust gas passes, sequentially from a front portion of the rearmost carrier The first wash coat may contain 36 to 46 wt % of ceria ($CeO_2$), 8 to 12 wt % of barium (based on BaO), 0.3 to 0.9 wt % of the precious metal, and the remainder being magnesium (Mg)-substituted alumina.

The second wash coat may contain 36 to 46 wt % of ceria ($CeO_2$), 8 to 12 wt % of barium (based on BaO), 0.2 to 0.6 wt % of the precious metal, and the remainder being magnesium (Mg)-substituted alumina.

The third wash coat may contain 25 to 33 wt % of ceria ($CeO_2$), 0.7 to 1.3 wt % of the precious metal, and the remainder being magnesium (Mg)-substituted alumina.

The fourth wash coat may contain 25 to 33 wt % of magnesium (Mg)-substituted alumina, 0.7 to 1.3 wt % of the precious metal, and the remainder being ceria ($CeO_2$).

The precious metal of the third wash coat may include platinum (Pt) and palladium (Pd), and the precious metal of the fourth wash coat may include platinum (Pt), palladium (Pd), and rhodium (Rh).

DETAILED DESCRIPTION

Figure 1A:
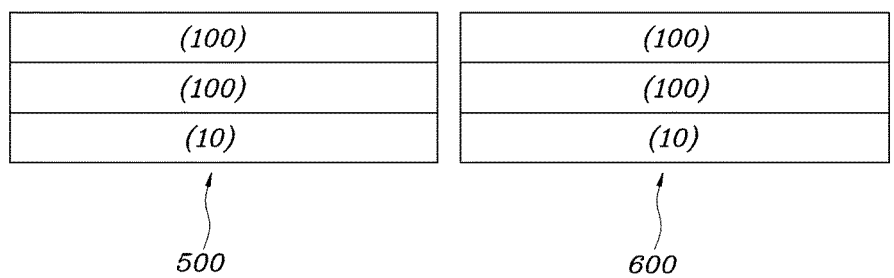
FIGS. 1A and 1B are views illustrating an LNT catalyst according to the related art and an LNT catalyst according to an exemplary embodiment of the present disclosure.
Figure 1B:
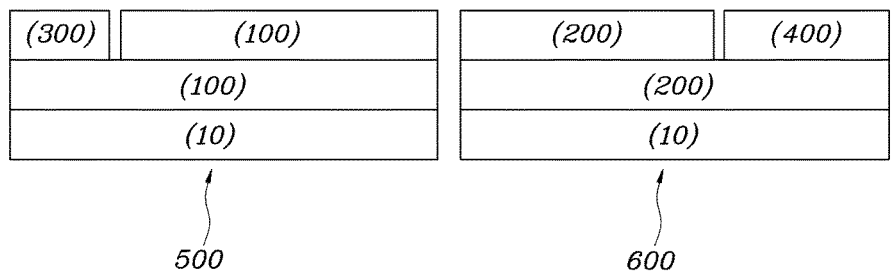
Figure 2:
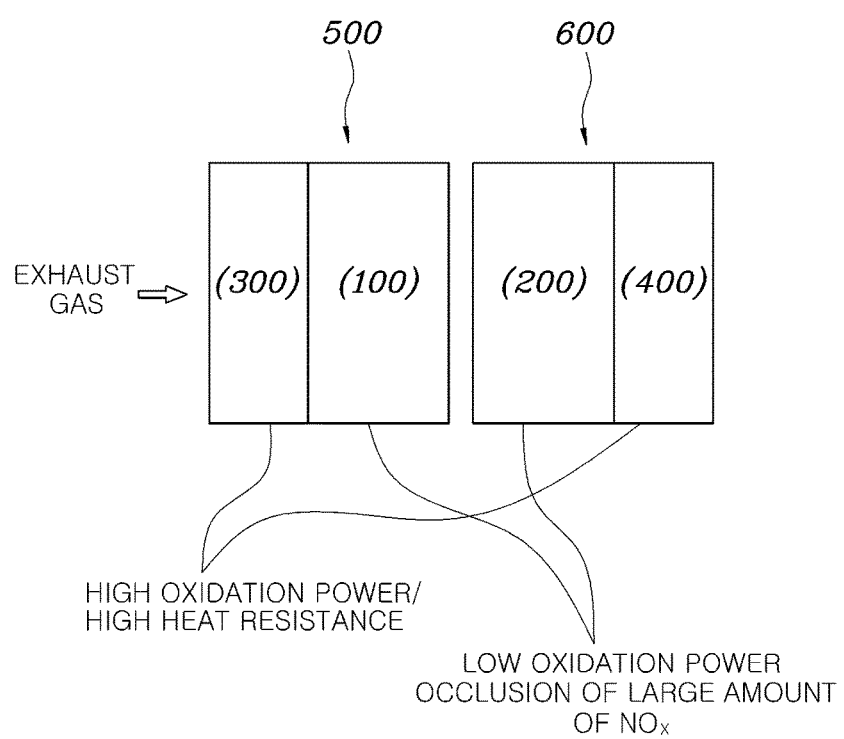
FIG. 2 is a view showing an LNT catalyst according to an exemplary embodiment of related art and the present disclosure.

Hereinafter, an exemplary embodiment of the present disclosure will be described with reference to the accompanying drawings.

A lean NOx trap (LNT) catalyst according to the present disclosure may be configured to include a plurality of carriers connected to each other in series, wherein each of the carriers may be embedded with at least one of a first wash coat 100 containing magnesium (Mg)-substituted alumina, ceria ($CeO_2$), barium (Ba), and a precious metal; a second wash coat 200 containing magnesium (Mg)-substituted alumina, ceria ($CeO_2$), barium (Ba), and a lower content of precious metal than the first wash coat 100; a third wash coat 300 containing magnesium (Mg)-substituted alumina, ceria ($CeO_2$), and a higher content of a precious metal than the first wash coat 100; and a fourth wash coat 400 containing magnesium (Mg)-substituted alumina, ceria ($CeO_2$), and a higher content of a precious metal than the first wash coat 100, a ratio of the magnesium-substituted alumina to ceria ($CeO_2$) being lower than that of the third wash coat 300, but the third and first wash coats 300 and 100 may be disposed in a foremost carrier 500 through which exhaust gas passes, sequentially from a front portion of the foremost carrier 500.

The plurality of carriers may be connected to each other in series to support a catalyst having purification and occlusion capacity therein. Further, the LNT catalyst may have a structure in which the plurality of carriers are connected to an exhaust pipe through which exhaust gas of a vehicle is emitted, such that the exhaust gas pass into the carrier.

The catalyst may suppress emission of NOx by storing NOx in basic occlusion materials such as Ba, Ce, and the like in a form of nitrates in an operation region under a lean atmosphere. When NOx occlusion is performed for a predetermined time, and thus the NOx occlusion capacity of the catalyst reaches an upper limit, an operation region under a rich condition, that is, an environment in which an oxygen concentration in the exhaust gas may be decreased and reducing components such as CO, HC, and the like, may be increased, is created through engine combustion control. Therefore, the occluded nitrates are desorbed, and NOx is reduced to $N_2$ by the reducing agent components such as HC, CO, $H_2$, etc.

The catalyst may exhibit NOx occlusion capacity in a range of 100 to 400° C. based on a catalyst temperature, and also may exhibit NOx reduction capacity at 250° C. or more. Particularly, in order to implement NOx occlusion capacity at a low catalyst temperature due to a low exhaust temperature, a Ce component in addition to Ba, the existing NOx occlusion material, may be additionally used in a catalyst for a diesel engine. A reduction reaction of NOx under the rich condition is mainly carried out by Pt and Rh, but in an urban driving condition in which a vehicle speed is not over 60 km/h, since the catalyst temperature is not heated to 250° C. or more and the reduction reaction of NOx is not activated, a problem that a large amount of NOx is emitted (slipped) may occur.

In the case of disposing a wash coat having the same characteristics as those of the third wash coat 300 containing a large amount of the precious metal such as Pt, Pd, or Rh having a function of oxidizing (purifying) CO, HC, and the like, at the front portion of the foremost carrier through which the exhaust gas passes, and disposing a wash coat having the same characteristics as those of the first wash coat 100 containing a sufficient amount of barium (Ba) and a relatively low content of the precious metal at the rear portion of the foremost carrier, while the exhaust passes through the third wash coat 300, CO, HC, and the like, are oxidized by the precious metal. While the exhaust gas passes through the first wash coat 100, NOx is occluded by barium (Ba), or the like.

Unlike a configuration in which a precious metal is uniformly dispersed in the entire wash coat supported on a first carrier through which exhaust gas passes in a dual brick catalyst according to the related art, in the case of distinguishing the front portion and the rear portion of the foremost carrier from each other and disposing a wash coat having a high content of the precious metal and having excellent heat resistance at the front portion thereof and disposing a wash coat having a low content of the precious metal at the rear portion thereof as in the present disclosure, an effect to be expected is as follows.

There may be a problem that oxidation heat generated when the precious metal oxidizes CO, HC, and the like, further increase a temperature of a high-temperature first carrier having a temperature already increased by the exhaust gas, which inhibits a occlusion function of barium (Ba) and ceria ($CeO_2$) existing in the wash coat, and thus NOx is emitted as it is. However, in the case of the configuration as in the present disclosure, since CO, HC, and the like, may be partially removed only in the front portion of the foremost carrier by intensively disposing the precious metal (Pt, Pd) having excellent heat resistance, and thus the temperature of the foremost wash coat may not be further increased, the occlusion function of barium (Ba) and ceria ($CeO_2$) may be maintained, such that the above-mentioned problem may be solved.

Further, a problem that it was impossible to expect an effect corresponding to injection of the precious metal in view of a manufacturing cost may be solved by efficiently disposing the precious metal only at the front portion of the foremost carrier, such that an improved effect in comparison to the same cost may be expected.

Further, in the case of the first wash coat 100, since oxidation power is limited by decreasing the content of the precious metal, CO, HC, and the like that is not oxidized in the foremost carrier 500 serving as an oxidant while moving to the next carrier, an effect of improving overall desulfurization capacity of the carrier may be expected.

As an exemplary embodiment of the present disclosure, even in the case of disposing a small amount of the third wash coat 300 which is relatively expensive due to a high content of the precious metal as compared to the first wash coat 100 which is relatively cheap, a sufficient purification effect may be expected. It is preferable to dispose the third wash coat 300 at the front portion of the carrier so as to occupy about 20 to 40% of a length of the carrier, and dispose the first wash coat 100 so as to occupy the rest thereof.

Further, in the case of disposing a first wash coat 100 layer composed of the first wash coat 100 which is relatively cheap between a supporter 10 disposed below the carrier and a composite wash coat layer composed of the third wash coat 300 and the first wash coat 100, similarly, a sufficient purification effect may be expected in comparison to the higher cost arrangement, thereby effectively decreasing a production cost.

A technical idea of the present disclosure is to provide a lean NOx trap (LNT) catalyst capable of preventing a foremost carrier from being degraded by oxidation heat and increasing occlusion capacity of the next carrier connected to the foremost carrier in series by disposing a plurality of carriers, including a wash coat, in series but disposing a wash coat containing a large amount of a precious metal at a front portion of a high-temperature foremost carrier 500 through which exhaust gas passes to partially remove CO, HC, or the like, and disposing a wash coat having relatively low oxidation power at the rear portion of the foremost carrier 500.

In the LNT catalyst according to the present disclosure, the first and third wash coats 100 and 300 may be disposed in a rearmost carrier 600 through which the exhaust gas passes sequentially from a front portion of the rearmost carrier 600.

In the case in which the exhaust gas passed through the front carriers reaches the rearmost carriers and passes through the first wash coat 100 in which barium (Ba) is sufficiently contained and the content of the precious metal is relatively low, all NOx that are not occluded up to now are occluded. Preferably, in the case in which the number of composed carriers is two, CO, HC, and the like, that are not oxidized may sufficiently remain in the exhaust gas passed through the foremost carrier, such that a reduction reaction with the occluded NOx may occur.

The exhaust gas passed through the first wash coat 100 finally passes through the third wash coat 300 in which the content of the precious metal is high, such that CO, HC, and the like, remaining in the exhaust gas may be oxidized, thereby completing a purification process.

Preferably, it is effective to increase a ratio of Rh having a reactivity higher than those of Pt and Pd in the precious metal contained in the wash coat disposed at a rear portion of the rearmost carrier. In the case of the rearmost carrier, since a temperature is not higher than that of the foremost carrier, greater heat resistance characteristics are not required.

At the time of disposing the wash coats in the rearmost carrier as in the foremost carrier described above, even in the case of disposing a small amount of the third wash coat 300 which is relatively expensive due to the high content of the precious metal as compared to the first wash coat 100 which is relatively cheap, a sufficient purification effect may also be expected. It is preferable to dispose the third wash coat 300 at the rear portion of the carrier so as to occupy about 20 to 40% of the length of the carrier, and dispose the first wash coat 100 so as to occupy the rest thereof.

Further, in the case of disposing the first wash coat 100 layer composed of the first wash coat 100 which is relatively cheap between the supporter 10 disposed below the carrier and the composite wash coat layer composed of the third wash coat 300 and the first wash coat 100, a sufficient purification effect may be expected in comparison to the cost, thereby effectively decreasing a production cost.

In the LNT catalyst according to the present disclosure, the second and third wash coats 200 and 300 may be disposed in the rearmost carrier 600 through which the exhaust gas passes, sequentially from the front portion thereof.

The second wash coat 200 may be a wash coat in which barium (Ba) is sufficiently contained but the content of the precious metal is low as compared to the first wash coat 100. The reason is that the occlusion function of NOx of the exhaust gas is a top priority to the wash coat disposed in the front portion of the rearmost carrier. An effect of decreasing a production cost while significantly decreasing a deterioration of the purification function may be expected by decreasing a use amount of the precious metal.

The exhaust gas passed through the second wash coat 200 finally passes through the third wash coat 300 in which the content of the precious metal is high, such that CO, HC, and the like remaining in the exhaust gas may be oxidized, thereby completing a purification process.

Due to a similar reason, at the time of disposing the wash coats in the rearmost carrier, even in the case of disposing a small amount of the third wash coat 300, which is relatively expensive due to the high content of the precious metal as compared to the second wash coat 200 which is relatively cheap, a sufficient purification effect may also be expected. It is preferable to dispose the third wash coat 300 at the rear portion of the carrier so as to occupy about 20 to 40% of the length of the carrier, and dispose the second wash coat 200 so as to occupy the rest thereof.

Further, in the case of disposing the first wash coat 100 layer composed of the first wash coat 100 which is relatively cheap between the supporter 10 disposed below the carrier and a composite wash coat layer composed of the second wash coat 200 and the third wash coat 300, a sufficient purification effect may be expected in comparison to the cost, thereby effectively decreasing the production cost. It is more preferable to dispose below the carrier a second wash coat 200 layer composed of the second wash coat 200 which is cheap due to a low content of the precious metal as compared to the first wash coat 100, instead of the first wash coat 100 layer.

In the LNT catalyst according to the present disclosure, the first and fourth wash coats 100 and 400 may be disposed in the rearmost carrier 600 through which the exhaust gas passes sequentially from the front portion thereof.

In the fourth wash coat 400, the content of the precious metal is high similar to the third wash coat 300. However, in the fourth wash coat 400, a content of the magnesium (Mg)-substituted alumina is low and a content of the ceria ($CeO_2$) is high as compared to the third wash coat 300.

Since the fourth wash coat 400 has a high content of ceria ($CeO_2$) as well as high oxidation power with respect to CO, HC, and the like remaining in the exhaust gas due to the high content of the precious metal, an oxidation power at a low temperature may be further increased as compared to the third wash coat 300. In other words, the fourth wash coat 400 is a wash coat of which reactivity is emphasized rather than heat resistance unlike the third wash coat 300. Due to this reason, the fourth wash coat 400 is disposed in the rear of the rearmost carrier through which the exhaust gas passes.

At the time of disposing the wash coats in the rearmost carrier, even in the case of disposing a small amount of the fourth wash coat 400 which is relatively expensive due to the high content of the precious metal as compared to the first wash coat 100 which is relatively cheap, a sufficient purification effect may also be expected. It is preferable to dispose the fourth wash coat 400 at the rear portion of the carrier so as to occupy about 20 to 40% of the length of the carrier, and dispose the first wash coat 100 so as to occupy the rest thereof.

Further, in the case of disposing the first wash coat 100 layer composed of the first wash coat 100 which is cheap between the supporter 10 disposed below the carrier and a composite wash coat layer composed of the first wash coat 100 and the fourth wash coat 400, a sufficient purification effect may be expected in comparison to the cost, thereby effectively decreasing the production cost. It is more preferable to dispose a second wash coat 200 layer composed of the second wash coat 200 which is cheap due to a low content of the precious metal as compared to the first wash coat 100 below the carrier, instead of the first wash coat 100 layer.

In the LNT catalyst according to the present disclosure, the second and fourth wash coats 200 and 400 may be disposed in the rearmost carrier 600 through which the exhaust gas passes sequentially from the front portion thereof.

As described above, in view of entire purification capacity and production cost, it may be more efficient to dispose the second wash coat 200 at the front portion of the rearmost carrier instead of the first wash coat 100, and dispose the fourth wash coat 400 in the rear portion of the rearmost carrier instead of the third wash coat 300, due to characteristics of the rearmost carrier.

At the time of disposing the wash coats in the rearmost carrier as described above, even in the case of disposing a small amount of the fourth wash coat 400 which is relatively expensive due to the high content of the precious metal as compared to the second wash coat 200 which is relatively cheap, a sufficient purification effect may also be expected. It is preferable to dispose the fourth wash coat 400 at the rear portion of the carrier so as to occupy about 20 to 40% of the length of the carrier, and dispose the second wash coat 200 so as to occupy the rest thereof.

Further, in the case of disposing the first wash coat 200 layer composed of the first wash coat 100 which is cheap between the supporter 10 disposed below the carrier and a composite wash coat layer composed of the second wash coat 200 and the fourth wash coat 400, a sufficient purification effect may be expected in comparison to the cost, thereby effectively decreasing the production cost. It is more preferable to dispose the second wash coat 200 layer composed of the second wash coat 200 which is cheap due to a low content of the precious metal in as compared to the first wash coat 100 below the carrier, instead of the first wash coat 100 layer.

In the LNT catalyst according to the present disclosure, the precious metal of the third wash coat 300 may include platinum (Pt) and palladium (Pd), and the precious metal of the fourth wash coat 400 may include platinum (Pt), palladium (Pd) and rhodium (Rh).

Since in the case in which the third wash coat 300 is disposed in the high-temperature foremost carrier, heat resistance is emphasized, and in the case in which the fourth wash coat 400 is disposed in the rearmost carrier, reactivity rather than heat resistance is emphasized, it is preferable that among the precious metals, rhodium (Rh) having poor heat resistance is excluded in the third wash coat 300, and rhodium (Rh) having excellent reactivity instead of heat resistance is included in the fourth wash coat 400.

(Preparation Method of Wash Coat)

In the LNT catalyst according to the present disclosure, a first wash coat 100 may contain 36 to 46 wt % of ceria ($CeO_2$), 8 to 12 wt % of barium (based on BaO), 0.3 to 0.9 wt % of the precious metal, and the remainder being magnesium (Mg)-substituted alumina.

As an example of the present disclosure, a first wash coat 100 was prepared so as to contain 48 wt % of magnesium (Mg)-substituted alumina, 41.4 wt % of ceria ($CeO_2$), 10 wt % of barium (based on BaO) corresponding to a NOx occlusion material, and 0.6 wt % of the precious metal based on the entire first wash coat 100, and Ba, Pt, Pd, and Rh were sequentially dispersed and supported on the magnesium (Mg)-substituted alumina and ceria ($CeO_2$) by a general fixation method. Thereafter, a wash coat in a slurry state was coated on a honeycomb carrier and dried/fired (at 500° C.).

In the LNT catalyst according to the present disclosure, a second wash coat 200 may contain 36 to 46 wt % of ceria ($CeO_2$), 8 to 12 wt % of barium (based on BaO), 0.2 to 0.6 wt % of the precious metal, and the remainder being magnesium (Mg)-substituted alumina.

As an example of the present disclosure, the second wash coat 200 was prepared in the same manner as in the first wash coat 100 except that a content of the supported precious metal was only ⅔ of that of the precious metal supported in the first wash coat 100. Thereafter, a wash coat in a slurry state was coated on a honeycomb carrier and dried/fired (at 500° C.)

In the LNT catalyst according to the present disclosure, a third wash coat 300 may contain 25 to 33 wt % of ceria ($CeO_2$), 0.7 to 1.3 wt % of the precious metal, and the remainder being magnesium (Mg)-substituted alumina.

As an example of the present disclosure, a third wash coat 300 was prepared so as to contain 70 wt % of magnesium (Mg)-substituted alumina, 29 wt % of ceria ($CeO_2$), and 1 wt % of the precious metal based on the entire third wash coat 300, and Pt and Pd were sequentially dispersed and supported on the magnesium (Mg)-substituted alumina and ceria ($CeO_2$) by a general fixation method in a state in which Rh was excluded. Thereafter, a wash coat in a slurry state was coated on a honeycomb carrier and dried/fired (at 500° C.)

In the LNT catalyst according to the present disclosure, a fourth wash coat 400 may contain 25 to 33 wt % of magnesium (Mg)-substituted alumina, 0.7 to 1.3 wt % of the precious metal, and the remainder being ceria ($CeO_2$).

As an example of the present disclosure, a fourth wash coat 400 was prepared so as to contain 29 wt % of magnesium (Mg)-substituted alumina, 70 wt % of ceria ($CeO_2$), and 1 wt % of the precious metal based on the entire fourth wash coat 400, and Pt, Pd, and Rh were sequentially dispersed and supported on the magnesium (Mg)-substituted alumina and ceria ($CeO_2$) by a general fixation method. Thereafter, a wash coat in a slurry state was coated on a honeycomb carrier and dried/fired (at 500° C.)

(Evaluation of Functions)

Figure 3A:
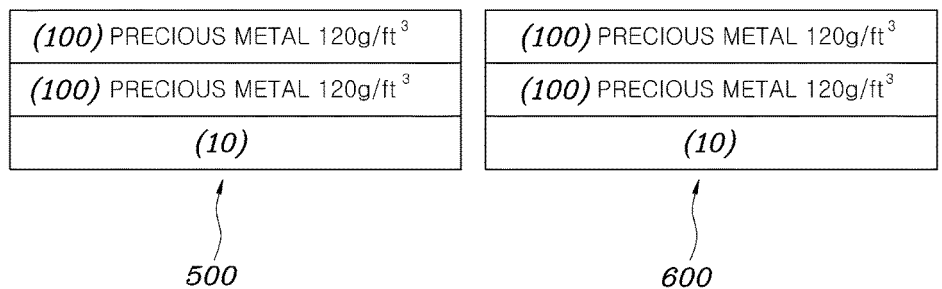
FIGS. 3A and 3B are views illustrating conditions of Examples and Comparative Examples of the present disclosure.
Figure 3B:
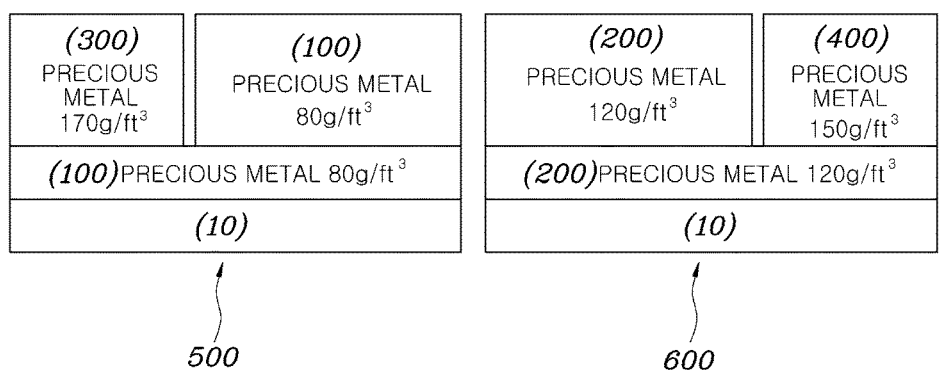

A ratio of purified NOx to NOx introduced for a total of 188 seconds at each temperature under a steady-state 180 s Lean/8 s Rich condition (evaluation condition) was calculated as a purification rate. In the lean atmosphere, the following conditions were satisfied: NO 200 ppm, 1000 ppm CO, 1000 ppmC1 Propylene, O2 8%, CO2 5%, H2O 5%, and N2 balance. In addition, in the rich atmosphere, the following conditions were satisfied: NO 200 ppm, 20000 ppm CO, 6000 ppmC1 Propylene, O2 0.7%, CO2 5%, H2O 5%, and N2 balance. Conditions of Example and Comparative Example are illustrated in FIGS. 3A and 3B.

Figure 4:
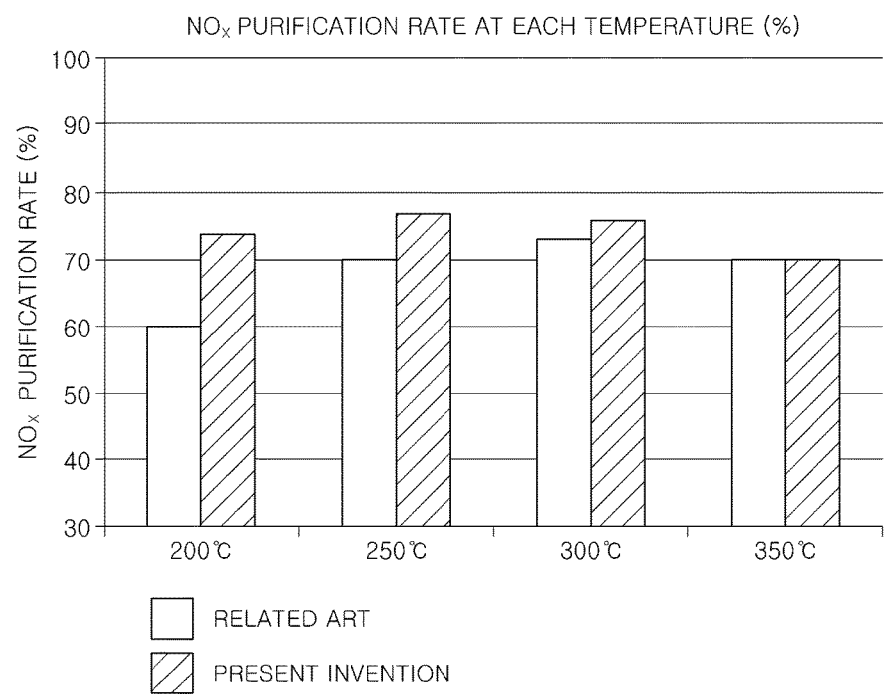
FIG. 4 is a graph illustrating a NOx purification rate depending on a temperature in Examples of the present disclosure.

As illustrated in FIG. 4, in the case of the NOx purification rate at each temperature, NOx occlusion capacity was improved at a low temperature region. The capacity was improved in the low temperature region in which capacity is generally degraded due to thermal degradation, which proved that intensive degradation due to concentration of heat load on the foremost carrier was prevented.

Figure 5:
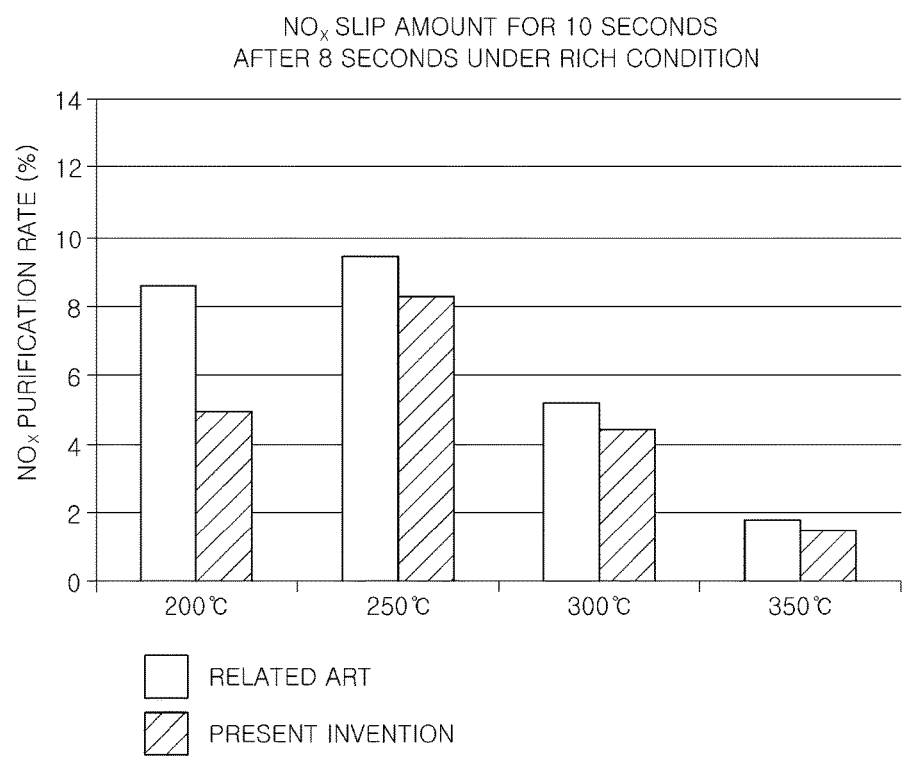
FIG. 5 is a graph illustrating a NOx slip amount under a rich condition in Examples of the present disclosure.

As illustrated in FIG. 5, when compared with a NOx slip amount under the rich atmosphere, it may be confirmed that NOx slip (emission) was decreased by reduction of Rh and ceria ($CeO_2$) in the fourth wash coat 400 of the rearmost carrier.

As described above, with the LNT catalyst according to the present disclosure, the wash coat in which the content of the precious metal is high may be intensively disposed at the front portion of the foremost carrier based on the exhaust gas, and thus it may be possible to prevent the high-temperature foremost carrier from being degraded by oxidation heat, thereby preventing NOx occlusion capacity of barium (Ba) and ceria ($CeO_2$) from being deteriorated. Further, a production cost may be decreased by promoting efficient utilization of the precious metal.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A lean NOx trap (LNT) catalyst comprising:
a plurality of carriers connected to each other in series,
wherein each of the plurality of carriers is embedded with at least two of a first wash coat containing magnesium (Mg)-substituted alumina, ceria (CeO2), barium (Ba), and a precious metal; a second wash coat containing magnesium (Mg)-substituted alumina, ceria (CeO2), barium (Ba), and a lower content of a precious metal than the first wash coat; a third wash coat containing magnesium (Mg)-substituted alumina, ceria (CeO2), and a higher content of a precious metal than the first wash coat; and a fourth wash coat containing magnesium (Mg)-substituted alumina, ceria (CeO2), and a higher content of a precious metal than the first wash coat, a ratio of the magnesium-substituted alumina to ceria (CeO2) being lower than that of the third wash coat,
wherein the third and first wash coats are disposed in a foremost carrier, through which exhaust gas passes, sequentially from a front portion of the foremost carrier, and
wherein the second and fourth wash coats are disposed in a rearmost carrier, through which the exhaust gas passes, sequentially from a front portion of the rearmost carrier.

2. A lean NOx trap (LNT) catalyst comprising:
a plurality of carriers connected to each other in series,
wherein each of the plurality of carriers is embedded with at least two of a first wash coat containing magnesium (Mg)-substituted alumina, ceria (CeO2), barium (Ba), and a precious metal; a second wash coat containing magnesium (Mg)-substituted alumina, ceria (CeO2), barium (Ba), and a lower content of a precious metal than the first wash coat; a third wash coat containing magnesium (Mg)-substituted alumina, ceria (CeO2), and a higher content of a precious metal than the first wash coat; and a fourth wash coat containing magnesium (Mg)-substituted alumina, ceria (CeO2), and a higher content of a precious metal than the first wash coat, a ratio of the magnesium-substituted alumina to ceria (CeO2) being lower than that of the third wash coat,
wherein the third and first wash coats are disposed in a foremost carrier, through which exhaust gas passes, sequentially from a front portion of the foremost carrier, and
wherein the first and fourth wash coats are disposed in a rearmost carrier, through which the exhaust gas passes, sequentially from a front portion of the rearmost carrier.

3. The LNT catalyst of claim 1, wherein the first wash coat contains 36 to 46 wt % of ceria (CeO.sub.2), 8 to 12 wt % of barium (based on BaO), 0.3 to 0.9 wt % of the precious metal, and the remainder being magnesium (Mg)-substituted alumina.

4. The LNT catalyst of claim 1, wherein the second wash coat contains 36 to 46 wt % of ceria (CeO.sub.2), 8 to 12 wt % of barium (based on BaO), 0.2 to 0.6 wt % of the precious metal, and the remainder being magnesium (Mg)-substituted alumina.

5. The LNT catalyst of claim 1, wherein the third wash coat contains 25 to 33 wt % of ceria (CeO.sub.2), 0.7 to 1.3 wt % of the precious metal, and the remainder being magnesium (Mg)-substituted alumina.

6. The LNT catalyst of claim 1, wherein the fourth wash coat contains 25 to 33 wt % of magnesium (Mg)-substituted alumina, 0.7 to 1.3 wt % of the precious metal, and the remainder being ceria (CeO.sub.2).

7. The LNT catalyst of claim 1, wherein the precious metal of the third wash coat includes platinum (Pt) and palladium (Pd), and the precious metal of the fourth wash coat includes platinum (Pt), palladium (Pd), and rhodium (Rh).

* * * * *